This invention relates to improved pressure vessel seals and more particularly to a high-pressure gold seal for a piston-cylinder type pressure vessel.

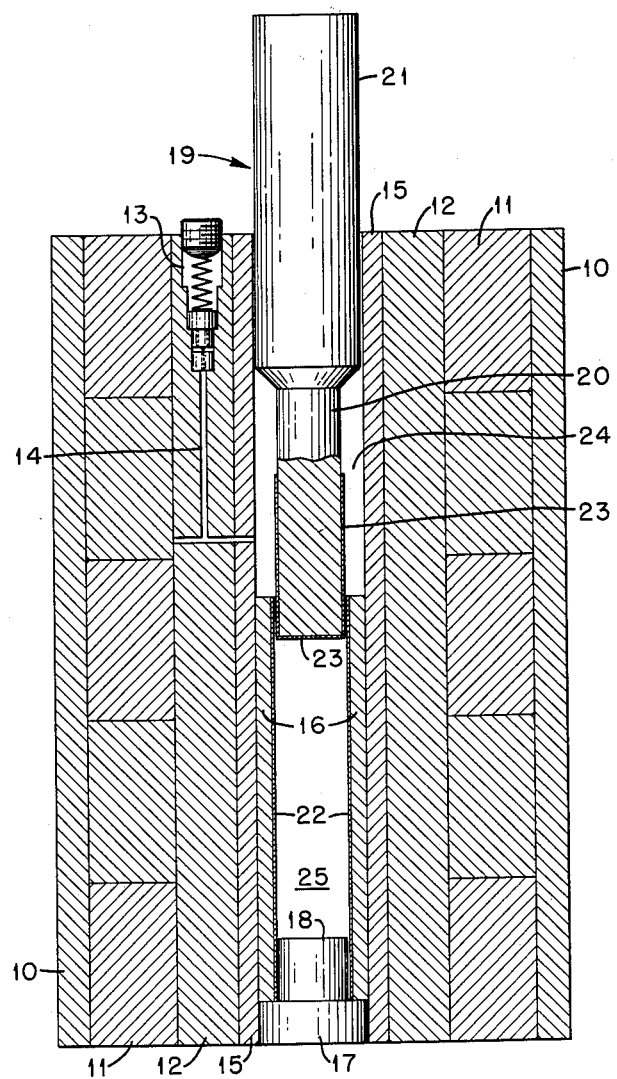
INVENTOR.
Alfred E. Smith 3,112,115
GOLD PRESSURE VESSEL SEAL
Alfred E. Smith, Clinton, Tenn., assignor to the United States of America as represented by the United States Atomic Energy Commission
Filed Jan. 31, 1963, Ser. No. 256,196
5 Claims. (Cl. 277—236)

One of the most convenient and useful means of achieving high pressure is the piston-cylinder type pressure vessel, wherein a piston member is slidably inserted into a cylinder or die member containing a pressure chamber. A pressure transmitting medium, fluid at the desired pressure, is usually used in such a pressure chamber, so that the pressure generated approaches desirable isostatic conditions.

It is well known in the art that when the pressure transmitting medium in the pressure chamber is placed under pressure, the die member expands radially at a rate greater than the radial expansion of the piston member. As the pressure within the pressure chamber increases, the clearance between the piston and die also increases. Of course, the pressure at which an undesirable clearance develops depends on the construction material and pressure vessel design. However, the amount of pressure which may be attained within the pressure chamber ultimately depends on the ability of the vessel to maintain a seal in the clearance developed between the piston and the die as pressure increases.

Various methods have been used to seal the space created by the differential expansion of the piston and the die member. At lower pressures (generally below 100,000 p.s.i.) an oil, such as mineral oil, is the most desirable pressure transmitting medium and may be sealed in the pressure chamber by means of a gasket material or O ring. Isostatic pressure conditions may be obtained by this method in a piston-cylinder pressure vessel up to only approximately 100,000 p.s.i., while still maintaining an adequate seal. At pressures between approximately 50,000 p.s.i. and 200,000 p.s.i. various salts, such as NaCl or KCl, tend to partially liquefy and may be used as pressure transmitting media. These partially liquefied salts solidify and act as a seal as they are extruded out of the pressure chamber into a zone of lower pressure in the pressure vessel. Salts, however, are not considered satisfactory pressure transmitting media because they produce longitudinal pressures significantly greater than their radial pressures, resulting in non-isostatic conditions in the pressure chamber.

It is, therefore, an object of this invention to provide an improved sealing means for a piston-cylinder type pressure vessel.

It is another object of this invention to provide an improved means of sealing a liquid pressure transmitting medium in a piston-cylinder type pressure vessel.

Another object of this invention is to provide true isostatic conditions, at high pressure, in a piston-cylinder type pressure vessel.

These and other objects of this invention are accomplished by providing an improved seal between the piston member and the die member of a piston-cylinder type pressure vessel, said improved seal comprising a thin layer of gold plated to the contacting surface of at least one of said members. I have found that, unexpectedly, a thin layer of gold, plated to the contacting surface of the piston or the cylinder, particularly one providing an interference fit, provides an effective seal to prevent leakage of a fluid pressure transmitting medium from the pressure chamber. Thus, the gold seal compensates for the differential radial expansion of the separate parts of the pressure vessel and isostatic pressures in excess of 300,000 p.s.i. have been obtained. Heretofore, such pressures have been unobtainable in a piston-cylinder type pressure vessel without elaborate external pressure vessel support to prevent undesirable cylinder expansion.

For a better understanding of my invention, reference is made to the single FIGURE of the drawing which represents one embodiment of a piston-cylinder type pressure vessel utilizing the present invention.

The term "interference fit" is used in the present application, in its usual sense, to refer to a fit in which there is an interference of metal (as opposed to clearance) between the piston member of the pressure vessel and the die member assembly as the piston member is inserted.

In the illustrated preferred embodiment, the present invention is incorporated in a piston-cylinder type pressure vessel assembly comprising a die member assembly 10 consisting of a multiplicity of shrunk-fit nested reinforcing cylinders, a stepped piston member 19 slidably inserted into the pressure chamber cylinder 16 to form a pressure chamber 25, and a thin layer of gold 23 plated on the reduced portion 20 of said stepped piston member 19 to fit in interference with a thin layer of gold 22 plated on the pressure chamber cylinder 16 of the die member assembly 10, thereby forming a high pressure seal for said pressure chamber 25.

Referring to the illustrated embodiment of the pressure vessel in more detail, the die member assembly 10 is provided with a longitudinal cylindrical opening into which are press-fitted a multiplicity of vertically stacked annular rings 11. A first hollow cylinder 12, provided with a pressure relief valve 13 and a pressure relief passageway 14, is press-fitted into the cylindrical cavity defined by the interior of annular rings 11. Press-fitted into first cylinder 12 is a second hollow cylinder 15. Passageway 14 also passes through second cylinder 15 to provide communication between valve 13 and the annular chamber 24. Hollow cylinders 12 and 15 are preferably the same length as die member 10. Press-fitted into the second hollow cylinder 15 is a pressure chamber cylinder 16 plated with a layer of gold 22 approximately one mil in thickness. The pressure chamber cylinder 16 is approximately half as long as second cylinder 15 and extends almost to the bottom of the second cylinder 15 where it contacts a sapphire closure member 17, fitted into the bottom of second cylinder 15 and having a reduced diameter section 18 extending into the lower interior of the pressure chamber cylinder 16 to effect a closure of the lower portion of pressure chamber 25.

A stepped piston member 19 is provided with a reduced-diameter portion 20 and a larger-diameter portion 21. The contacting surface of reduced-diameter portion 20 of piston 19 is plated with a layer of gold 23 approximately one mil in thickness and the diameter of said reduced-diameter portion is such as to provide a diametrical interference fit with the pressure chamber cylinder 16 of approximately one mil after the contacting surfaces have been gold plated. The larger-diameter portion 21 of piston member 19 is designed to fit snugly, but slidably, into the upper portion of second cylinder 15.

In the withdrawn position, as shown in the drawing, the reduced-diameter portion 20 of piston member 19 forms an annulus 24 between itself and second cylinder 15. Pressure chamber 25 which serves as a specimen chamber and receptacle for the pressure transmitting medium is defined by closure member 17, reduced-diameter portion 20 of piston member 19 and the interior of pressure chamber cylinder 16.

Both the piston member and the die assembly are preferably constructed of the strongest available steels capable of withstanding the pressures desired. The gold in the gold layers is preferably as pure and soft as may be obtained by electroplating and these soft gold layers may be plated on the piston and/or cylinder contacting surfaces by any known method of electroplating capable of depositing a pure, soft gold plate of controlled thickness. The designation "soft gold" as used herein indicates gold with a 25 gram Knoop hardness less than 100 on the surface of the gold plate. Impure and harder gold plates tend to spall or peel from the plated surface. It has been found that the thickness of the soft gold plate required is in the range of 0.1 to 1 mil, and that plate thickness in excess of 1 mil should be avoided because upon insertion of the piston, in interference, excess gold tends to bleed or peel from the plated surfaces.

In operation, employing the pressure vessel embodiment previously described, with the piston member 19 removed, a specimen is placed in the pressure chamber 25 and the remainder of the chamber is filled with a pressure transmitting medium, such as oil or water. The reduced chamber portion 20 of the piston member 19 is partially inserted, in interference, into cylinder 16, annulus 24 is then filled with the pressure transmitting medium, and the larger-diameter portion 21 of piston member 19 is inserted into cylinder 15. The pressure relief valve 13 is set to relieve at a desired pressure and the pressure vessel assembly is then placed in a pressing means, such as a hydraulic ram, to place the piston and die assembly under axial load for the pressing operation.

Utilizing the piston-cylinder pressure vessel with the gold seal, and liquid pressure transmitting medium as herein described, the inventor has regularly achieved isostatic pressures in excess of 300,000 p.s.i., with occasional excursions in excess of 350,000 p.s.i., without leakage, through the seal, caused by differential radial expansion of the piston and die assembly.

In addition to the ability of the gold seal to compensate for differential radial expansion in the pressure vessel, it has been found that, even with repeated use in interference fit, the plated surfaces are neither scratched nor marred, a mirror finish can be maintained, and the wear of the plated surfaces is relatively slow even though the piston is driven against initial lateral forces exceeding 100,000 p.s.i.

It will be understood that the preferred embodiment described and illustrated herein represents a complicated pressure vessel assembly for achieving high pressures, that this embodiment and description are given for the purpose of illustration only and the gold seal may be used effectively in simpler piston-cylinder type pressure vessels for use at a lower pressure range, and that the invention is to be limited only by the scope of the appended claims.

What is claimed is:

1. In a piston-cylinder type pressure vessel comprising a female die member defining a pressure chamber and a male piston member slidably disposed in said pressure chamber, said pressure chamber being adapted to receive a specimen to be pressed and a pressure transmitting medium, the improved means for providing a seal between said female die member and said male piston member which comprises a layer of gold plated on the contacting surface of at least one of said members, said layer of gold being of sufficient thickness to provide an interference fit between said die member and said piston member.

2. The improvement of claim 1 wherein the layer of gold is between 0.1 and 1 mil thick.

3. In a piston-cylinder type pressure vessel comprising a female die member defining a pressure chamber and a male piston member slidably disposed in said pressure chamber, said pressure chamber being adapted to receive a specimen to be pressed and a pressure transmitting medium, the improved means for providing a seal between said female die member and said male piston member which comprises a layer of gold plated on the contacting surface of said female die member, said layer of gold being of sufficient thickness to provide an interference fit between said die member and said piston member.

4. In a piston-cylinder type pressure vessel comprising a female die member defining a pressure chamber and a male piston member slidably disposed in said pressure chamber, said pressure chamber being adapted to receive a specimen to be pressed and a pressure transmitting medium, the improved means for providing a seal between said female die member and said male piston member which comprises a layer of gold plated on the contacting surface of said male piston member, said layer of gold being of sufficient thickness to provide an interference fit between said die member and said piston member.

5. In a piston-cylinder type pressure vessel comprising a female die member defining a pressure chamber and a male piston member slidably disposed in said pressure chamber, said pressure chamber being adapted to receive a specimen to be pressed and a pressure transmitting medium, the improved means for providing a seal between said female die member and said male piston member which comprises respective layers of gold plate carried by the contacting surfaces of said die member and said piston member, said layers of gold being of sufficient thickness to provide an interference fit between said die member and said piston member.

References Cited in the file of this patent

FOREIGN PATENTS 450,274    Great Britain _____ July 14, 1936